May 17, 1932.  H. HEPPERLE  1,858,956
MOLDING MACHINE
Filed Sept. 25, 1928    2 Sheets-Sheet 1
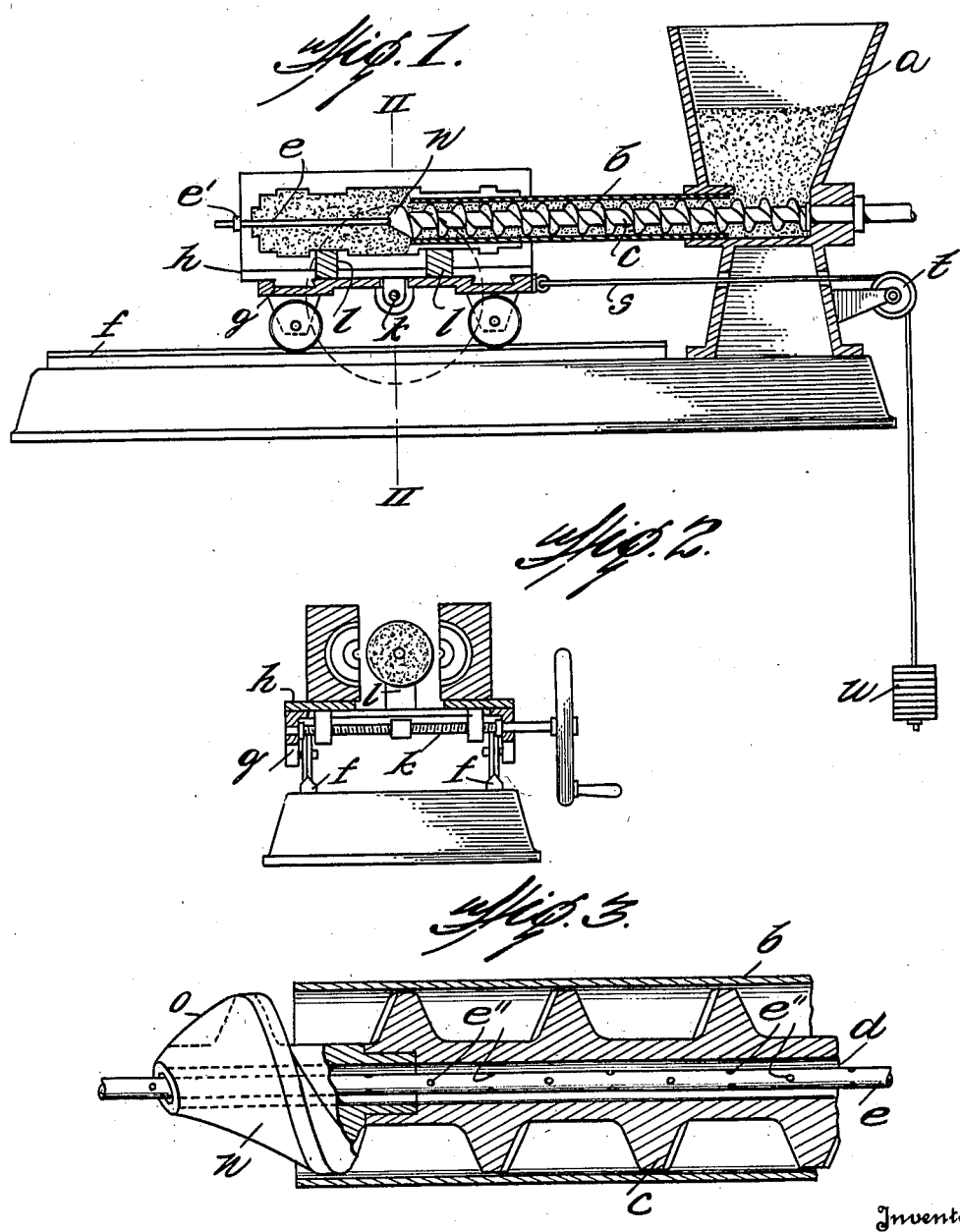

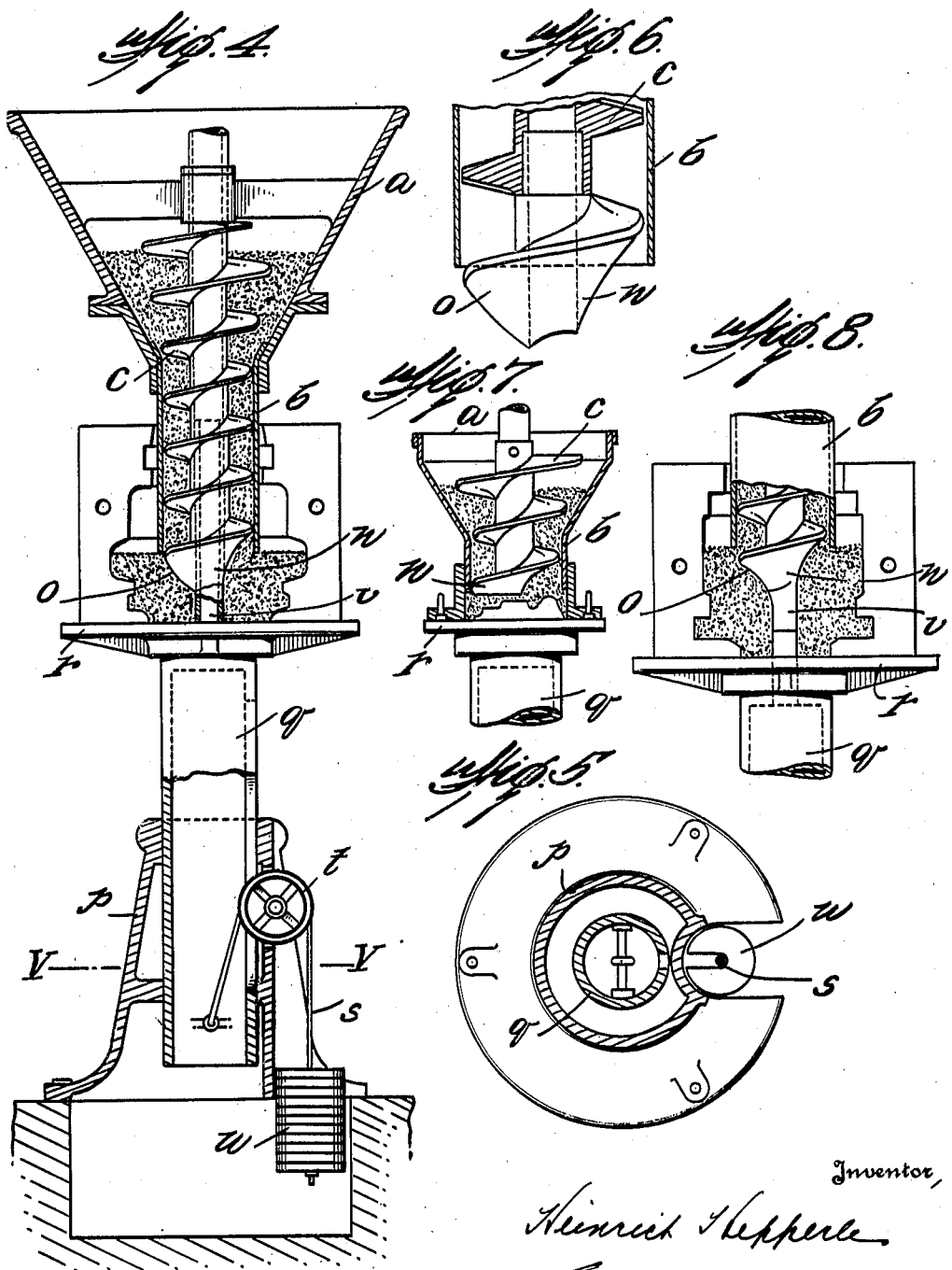

Patented May 17, 1932

1,858,956

UNITED STATES PATENT OFFICE

HEINRICH HEPPERLE, OF MÜLHEIM, RUHR, GERMANY

MOLDING MACHINE

Application filed September 25, 1928, Serial No. 308,192, and in Germany November 5, 1925.

The invention relates to molding machines for molding clay pipes and similar objects and in which the molding material is fed into the molding box by a pressure worm guided in a tube, and is distinguished from known constructions of this kind by the feature that the pressure worm tube and the mold slidable in relation thereto move apart telescopically corresponding with the continuous increase in the filling of the mold with the molding material. This telescopic moving apart of the molding box and pressure worm tube, in contradistinction to the known arrangements where the molding box and the worm remain in the same relative position during filling and where in consequence the material first fed in by the worm must be pressed through the whole length of the box, makes possible the production of molds with substantially uniform structure. The molding material leaving the end of the worm is fed to exactly the part of the molding box at which it is required. As soon as it is sufficiently packed, the molding box and pressure worm move apart thus leaving space for further filling under the same pressure. To regulate this pressure devices are provided which permit the commencement of the sliding movement to be made dependent on the attainment of a definite adjustable pressure in the molding box. Further the pressure surface of the worm acting on the material in the molding box is made exchangeable in order that its operation may be adapted to the conditions prevailing for the time being. A further feature consists in the construction of the molding box for facilitating removal of the completed molds.

The invention is explained in further detail below with reference to the accompanying drawings in which Figure 1 is a longitudinal section of a core molding machine with horizontal relative movement between the molding box and worm, Figure 2 is a cross section on the line II—II of Figure 1 and Figure 3 is a section on an enlarged scale of the front end of the worm;

Figure 4 illustrates a molding machine according to the invention with vertical relative motion, Figure 5 is a section on the line V—V of Figure 4, while Figures 6 to 8 show various forms of the exchangeable worm head and their modes of action.

The pressure devices of the molding machine consist in known manner of a tube $b$ provided with a filling hopper $a$, in which tube a worm $c$ is rotatably borne, and which may be provided in known manner with an axial bore $d$ to receive a core rod or air vent $e$. This air vent is mounted at one end to the mold as shown at $e'$ and extends axially through the mold and feed screw. Lateral openings $e''$ are formed through the vent pipe and serve as passages through which air may pass as the mold is filled and thereby allow the material to be tightly packed in the mold. In the core molding machine shown in Figures 1 and 2, a carriage $g$, upon which slides $h$ for carrying the core box halves are provided, runs on rails $f$ in front of the pressure devices. The slides $h$ and therewith the core box halves can be caused to recede from or approach the loose core supports $l$ by means of the right and left hand threaded spindle $k$. On the carriage is a regulatable brake device $s$, $u$, by which the running of the vehicle can be adjusted. The head $n$ of the worm projects out of the tube $b$ and here has an end surface $o$ running out into wedge form as can be seen in Figure 3.

In the vertical embodiment shown in Figures 4 and 5, a vertically slidable tube $q$ having a table $r$ upon which the molds to be filled are placed, is carried beneath the worm tube in a guide pedestal $p$. Similarly to the form shown in Figures 1 and 2, a rope $s$ guided over a roller $t$ and carrying a regulatable load $u$, is secured to the tube $q$. The worm head $n$ is exchangeable.

The mode of operation of these arrangements is as follows. The mold to be filled is placed on the table $r$ or carriage $g$ and closed together as far as may be necessary. In the form shown in Figures 1 and 2, for this purpose, after the loose core box parts $l$ have been placed in the proper positions on the carriage, the core box halves secured on the slides $h$ are closed together by the aid of the screw spindle $k$, the parts $l$ forming those parts of the walls of the core box unaffected by the slide movement. The carriage or table is then moved towards the pressure devices, the molding box being moved over the tube enclosing the worm until the end of the worm projecting from the tube reaches the end of the molding box. After the desired degree of pressure which is necessary to feed the carriage or table has been set by the adjustable brake or weight load $u$, the molding material plastic clay, for instance, is fed into the box by rotation of the worm, when owing to the developed pressure the worm continuously forces the carriage or table away and the box is evenly filled with molding material until its other end is reached. In the form shown in Figures 1 and 2, when the mold is completely filled the molding box is opened by means of the spindle $k$, the parts $i$ being moved apart sideways until the molding body, for example, a clay pipe, can be lifted from the loose supports $l$.

The pressure developed by the worm head exerts a greater or smaller lateral component according to the inclination of the pressure surfaces $o$ of the worm head. The form of the worm head is therefore advantageously suited to the shape being molded. If flat shapes are being produced, as shown in Figure 7, the end of the worm can also be flat, but if the pipes or other articles being molded have end flanges and grooves or lateral recesses and projections as in Figures 4 and 8, a correspondingly inclined sloping pressure surface is better.

If the molded body is to have a cylindrical hollow space formed within it, the worm head is provided with a corresponding projection $v$ (see Figures 4 and 8). In order to enable the machine to be readily adapted for such varying shapes, the worm head $n$ is made exchangeable, being set for example as shown in Figure 6, in the end of the hollow worm shaft, and there held by suitable means as by screwing.

Instead of the illustrated weight loading, a friction brake could be used to regulate the movement of the carriage or table, but the former method has the advantage that the pressure can be more easily and exactly regulated than the resistance of the brake in which the pressure is dependent to a much greater extent on the coefficient of friction prevailing for the time being. Instead of permitting the mold to move in relation to the feed devices, the feed devices could be made to move in relation to the mold.

What I claim is:

1. In a molding machine of the character described, the combination of a feed tube, a hopper communicating with one end of said tube for the introduction of the molding material therefrom thereinto, a movable carriage, a mold mounted on the carriage and telescopically engaging the discharge end of the tube, a feed screw arranged coaxially within and extending at one end beyond the discharge end of the tube, said end of the feed screw being provided with a wedge-shaped head disposed within the mold chamber and presenting inclined surfaces operating to feed the material longitudinally of the mold and also laterally thereof, said feed screw being hollow throughout, a hollow core rod provided with lateral apertures spaced throughout its length, said rod extending through the feed screw and having one end fixed to the mold end, and means for opposing a yielding resistance to the movement of the carriage and the mold under the pressure of the material fed into the mold by the feed screw.

2. In a molding machine of the character described, the combination of a feed tube, a hopper communicating with one end of said tube for the introduction of the molding material therefrom thereinto, a movable carriage, a mold chamber mounted on the carriage and telescopically engaging the tube and comprising longitudinally divided sections, means for moving said sections toward and from each other, a feed screw arranged coaxially within and extending at one end beyond the discharge end of the tube, said end of the feed screw being provided with a wedge-shaped head disposed within the mold chamber and presenting inclined surfaces operating to feed the material longitudinally of the mold and also laterally thereof, said feed screw being hollow throughout, a hollow core rod provided with lateral apertures spaced throughout its length, said rod extending through the feed screw and having one end fixed to the mold end, and means for opposing a yielding resistance to the movement of the carriage and the mold under the pressure of the material fed into the mold by the feed screw.

3. In a molding apparatus of the character described, the combination of a wheeled supporting carriage, a feed tube, a material containing hopper communicating at one end with the feed tube for supplying molding material to the latter, a mold chamber mounted upon the carriage and telescopically engaging the opposite end of the tube and comprising longitudinally divided sections mounted for relative lateral sliding movements on the carriage, a right and left hand threaded shaft for adjusting said mold sections toward and from each other, a feed screw axially arranged within the feed tube and projecting at one end into the mold chamber and beyond the discharge end of the tube, a wedge-shaped pressure head upon the latter-named end of the feed screw arranged within the mold chamber and beyond the discharge end of the tube and operating to feed and compress the material longitudinally and laterally of the mold chamber, said feed screw being hollow throughout, and a hollow core rod provided with lateral apertures spaced throughout its length, said rod extending through the feed screw and having one end fixed to the mold end.

4. In a molding machine, a feed tube, a movable carriage, a mold carried by said carriage and having one end closed and its other end open and slidably receiving said tube, a feed screw in said tube formed with an axially extending bore, an air vent pipe extending axially through the mold and slidably engaged in the bore of said screw, said pipe having its outer end connected with the closed end of the mold and being formed with side openings whereby air in the mold may escape through the pipe as the mold is filled.

5. In a molding machine, a feed tube, a mold open at one end and slidably receiving the feed tube, a feed screw in said tube having an axially extending bore, and an air vent pipe extending axially through said mold and slidably received in the bore of said screw, said pipe being formed with side openings whereby air in the mold can escape as the mold is filled.

In testimony whereof I have signed my name to this specification.

HEINRICH HEPPERLE.